(12) United States Patent
Damento et al.

(10) Patent No.: US 7,684,545 B2
(45) Date of Patent: Mar. 23, 2010

(54) X-RAY WINDOW AND RESISTIVE HEATER

(75) Inventors: Michael A. Damento, Tucson, AZ (US); Hugh F. Garvey, Tucson, AZ (US)

(73) Assignee: Rigaku Innovative Technologies, Inc., Auburn Hills, MI (US)

( * ) Notice: Subject to any disclaimer, the term of this patent is extended or adjusted under 35 U.S.C. 154(b) by 93 days.

(21) Appl. No.: 11/928,638

(22) Filed: Oct. 30, 2007

(65) Prior Publication Data

US 2009/0110151 A1    Apr. 30, 2009

(51) Int. Cl.
*G21K 1/00* (2006.01)
*H05G 1/64* (2006.01)

(52) U.S. Cl. .............. 378/161; 378/98.3; 378/98.8; 250/370.11

(58) Field of Classification Search .............. 378/98.2, 378/98.3, 98.8, 161; 250/363.02, 368, 369, 250/370.08, 370.09, 370.11, 370.15
See application file for complete search history.

(56) References Cited

U.S. PATENT DOCUMENTS

| | | | | |
|---|---|---|---|---|
| 3,676,671 A | * | 7/1972 | Sheldon ................. 250/368 |
| 4,604,649 A | * | 8/1986 | Carollo et al. ............. 378/98.5 |
| 4,672,207 A | | 6/1987 | Derenzo |
| 4,810,885 A | * | 3/1989 | Persyk et al. .......... 250/363.02 |
| 4,825,078 A | * | 4/1989 | Huber et al. ............... 250/372 |
| 5,329,569 A | * | 7/1994 | Spielman .................... 378/161 |
| 5,335,259 A | * | 8/1994 | Hayashida et al. .......... 378/161 |
| 5,519,752 A | * | 5/1996 | Spielman .................... 378/161 |
| 5,578,360 A | * | 11/1996 | Viitanen .................... 428/138 |
| 6,448,544 B1 | * | 9/2002 | Stanton et al. ............ 250/208.1 |
| 6,573,640 B1 | * | 6/2003 | Hakamata et al. ............. 313/39 |
| 6,818,885 B2 | * | 11/2004 | Negi et al. .................. 250/239 |
| 6,881,961 B2 | * | 4/2005 | Watanabe .............. 250/370.15 |
| 7,199,369 B1 | * | 4/2007 | Heverly .................. 250/361 R |
| 7,291,843 B2 | * | 11/2007 | Monin et al. ........... 250/370.11 |
| 7,378,664 B1 | * | 5/2008 | Howard et al. ......... 250/370.15 |
| 2008/0192897 A1 | * | 8/2008 | Piorek et al. ............... 378/98.8 |

FOREIGN PATENT DOCUMENTS

| | | |
|---|---|---|
| EP | 0 262 524 A1 | 9/1987 |
| EP | 0 337 096 A1 | 2/1989 |
| WO | WO 01/96902 A2 | 12/2001 |

OTHER PUBLICATIONS

Notification of Transmittal of the International Search Report and the Written Opinion of the International Searching Authority, or the Declaration dated Jan. 21, 2009.

\* cited by examiner

*Primary Examiner*—Edward J Glick
*Assistant Examiner*—Thomas R Artman
(74) *Attorney, Agent, or Firm*—Brinks Hofer Gilson & Lione

(57) ABSTRACT

The system includes a conductive window, a spectrum changing layer, a fiber optic bundle, a camera sensor, and a power supply. The spectrum changing layer is excited by the x-rays and emits a different wavelength of light, such as visible light. The fiber optic bundle receives the visible light from the spectrum changing material and transmits the visible light to the camera sensor. The camera sensor detects the light emitted from the spectrum changing layer and converts the information to electronic signals. The camera sensor is cooled by a cooling device, as such thermal conduction may cool the fiber optic bundle. To avoid condensation, current may flow through the conductive window thereby heating the conductive window.

12 Claims, 1 Drawing Sheet

X-RAY WINDOW AND RESISTIVE HEATER

BACKGROUND OF THE INVENTION

1. Field of the Invention

The present invention generally relates to a system for an x-ray camera.

2. Description of Related Art

X-ray cameras have been used in industry for applications such as crystallography. Typically, these systems generally include an x-ray source that excites a sample and an x-ray camera that receives x-rays from the subject. The x-ray camera may use a detector such as a CCD array. In x-ray applications, the CCD array may often need to be cooled to improve performance. However, changes in temperature within the camera can cause condensation to form within the optical path. Condensation can absorb the x-ray and distort the information received by the x-ray camera.

In view of the above, it is apparent that there exists a need for an improved x-ray camera that reduces condensation.

SUMMARY OF THE INVENTION

In satisfying the above need, as well as overcoming the enumerated drawbacks and other limitations of the related art, the present invention provides improved x-ray camera.

The system includes a conductive window, a spectrum changing layer, a fiber optic bundle, a camera sensor, and a power supply. The conductive window may be an aluminized film window allowing the window to have a high transmission for x-rays, while blocking ambient light. Further, an aluminized window may support a vacuum around the spectrum changing layer and the fiber optic bundle. Many films cannot support a vacuum over a long period of time. The spectrum changing layer is located between the window and the fiber optic bundle. The spectrum changing layer is excited by the x-rays and emits a different wavelength of light, such as visible light. The fiber optic bundle receives the visible light from the spectrum changing material and transmits the visible light to the camera sensor. The camera sensor detects the light emitted from the spectrum changing layer and converts the information to electronic signals. The camera sensor is cooled by a cooling device, as such thermal conduction may cool the fiber optic bundle.

To prevent condensation at the spectrum changing layer, film window may be a conductive film window. As such, the power supply may be connected to the conductive film window to provide an electric current through the conductive film window thereby heating the conductive film window. In addition, a sensor and a controller may be provided to monitor the temperature of the conductive film window and adjust the current supplied through the conductive film window.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
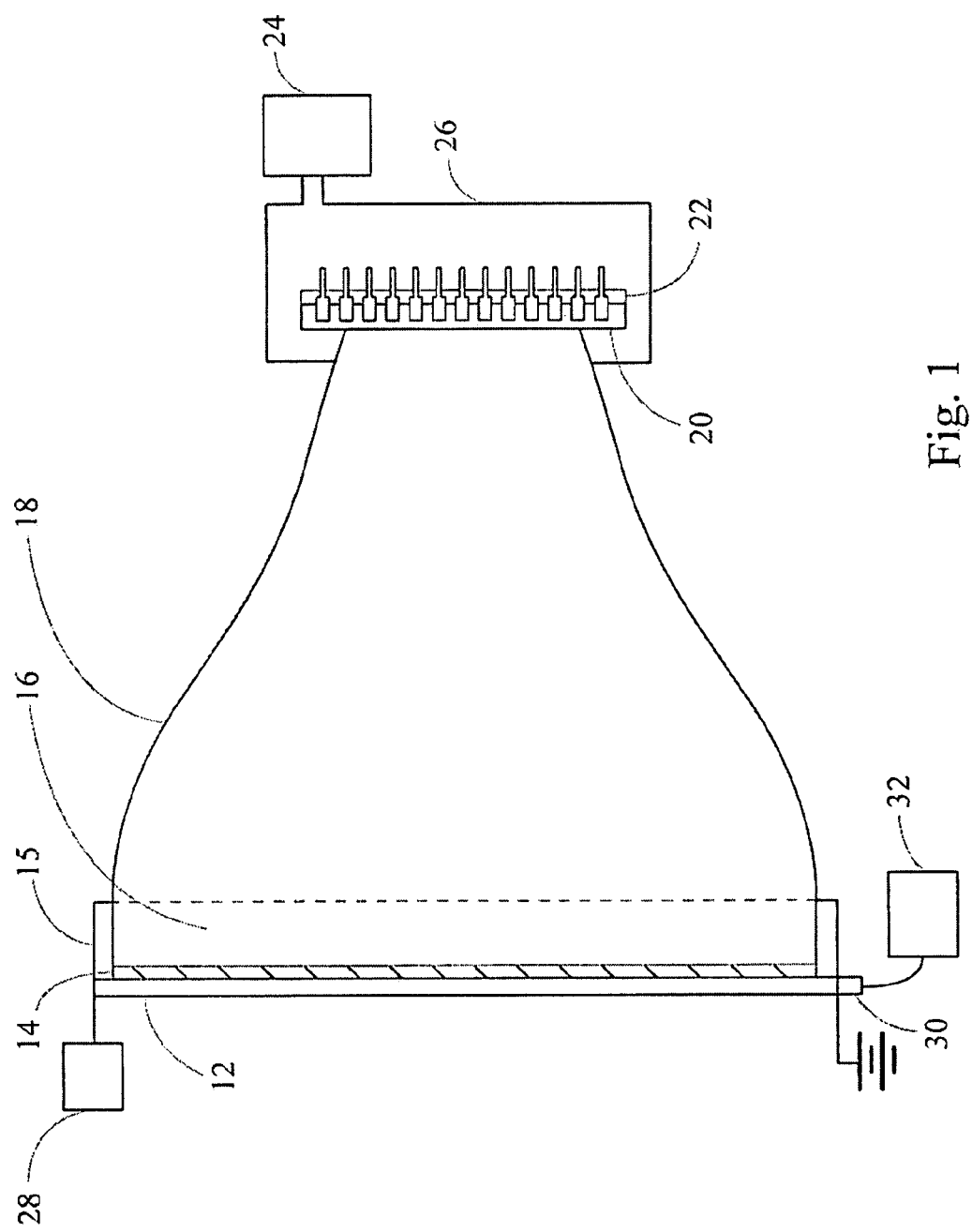
FIG. 1 is sectional side view of an x-ray camera.

Referring now to FIG. 1, a system embodying the principles of the present invention is illustrated therein and designated at 10. As its primary components, the system 10 includes a window 12, a spectrum changing material 14, and a detector array 20.

Generally, x-rays travel through the window 12 and into the spectrum changing material 14. As such, the window should be made of a material having low attenuation to x-rays. For example, the window 12 may be formed from a film, such as a polyimide film. The functioning of the window 12 will be provided in greater detail below.

The spectrum changing material 14 is located adjacent the window 12 and may be a material that when excited by x-rays emits a light in another spectrum such as the visible spectrum. For example, the spectrum changing material 14 may comprise a phosphor layer that emits visible light when excited by x-rays. A coupling 16 is located adjacent to the spectrum changing material 14 and is configured to locate the ends of a fiber bundle 18 adjacent to the spectrum changing material 14 allowing the fiber bundle 18 to transmits the light energy from the spectrum changing material 14 to the detector array 20.

As mentioned above, the detector 20 may be a CCD array, CMOS array, or other photo-sensitive array commonly available in a chip format. In addition, the detector 20 may be cooled, for example, by a thermoelectric cooler 22 located adjacent the chip. In addition, a chamber 26 may be formed around the detector 20 and a portion of the fiber bundle 18 to create a vacuum, thereby improving performance of the camera. Alternatively, a refrigeration system 24 may be used in conjunction with or instead of the thermoelectric cooler 22.

Further, to prevent condensation and improve camera performance, a chamber wall 15 may cooperate with the window 12 and the fiber optic bundle 18 to generate a vacuum chamber including the interface between the window 12 and the spectrum changing material 14 and the fiber optic bundle 18. As described above, the window 12 may be a plastic film such as a polyimide film having a thickness of about one thousandth of an inch. However, many plastic films do not provide an adequate material for forming a vacuum around the spectrum changing material 14. As such, the window 12 may be a metalized plastic film and more particularly may be an aluminized plastic film providing low attenuation of x-rays while providing a proper barrier to generate a vacuum around the spectrum changing material 14.

The window 12 may also be a conductive film window. To adjust for changes in temperature of the window 12, the conductive film may be connected to a power supply 28 at one side of the conductive film and an electrical ground at the other side. As such, an electrical current may be caused to flow through the window 12 thereby heating the window 12, for example, in a resistive fashion. Accordingly, utilization of an aluminized plastic film provides the conductive aspect allowing current to be generated through the film for heating purposes, while also providing sealing characteristics for maintaining the vacuum around the spectrum changing material 14. In this manner, the aluminum layer applied to the plastic film, such as a polyimide film should be less than 200 nanometers thick and for some applications may be about 100 nanometers thick. As such, the film has a high transmission for x-rays, blocks visible light, and is impermeable to air so it can support a vacuum. This film is also capable of carrying a significant electrical current to provide resistive heating. The vacuum has the ability to force the phosphor of the spectrum changing material 14 against the input face of the fiber optic bundle 18.

Thermal conduction through the fiber optic bundle 18 can lower the temperature of the input face of the fiber optic bundle 18 below ambient temperature, creating the potential for water condensation at the face of the fiber optic bundle 18 and the spectrum changing material 14. Condensation will decrease the x-ray transmission into the detector and create unwanted scatter of the x-rays. This could result in an errant reading by the system. Further, corrosion and other degradation could occur affecting the materials that make up the camera.

A sensor 30 may be provided to monitor the temperature of the window 12. The sensor 30 may be a thermocouple or alternatively may be an infrared temperature sensor. One of ordinary skill in the art would understand that other known temperature sensing devices could be readily used. The sensor 30 is in communication with the controller 32. The controller 32 is configured to monitor the temperature of the window 12. Accordingly, the controller 32 may be in communication with the power supply 28 to provide a feedback loop and adjust the flow of current through the conductive film of window 12 based on the sensor signal provided from the temperature sensor 30.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A system for an x-ray camera, the system comprising:
    a conductive film window comprised of a polyimide film and an aluminum layer;
    a spectrum changing layer adjacent to the conductive film window
    a fiber optic bundle coupled to the to the conductive film window; and
    a camera sensor optically coupled to the fiber optic bundle, the camera sensor being cooled by a cooling device, wherein the fiber optic bundle is configured to transmit light energy from the spectrum changing layer to the camera sensor;
    a power supply configured to provide an electrical current through the conductive film window to heat the conductive film window and prevent condensation;
    wherein the conductive film window cooperates with a coupling and the fiber optic bundle to create a vacuum.

2. The system according to claim 1, wherein the aluminum layer is less than 200 nanometers thick and the electric current flows through the aluminum layer.

3. The system according to claim 1, wherein the vacuum encloses the spectrum changing layer.

4. The system according to claim 1, wherein the spectrum changing layer is a phosphor layer.

5. The system according to claim 1, further comprising a sensor configured to monitor the temperature of the conductive film window.

6. The system according to claim 5, further comprising controller to monitor a sensor signal from the sensor and adjust the flow of current through the conductive film window based on the sensor signal.

7. A system for an x-ray camera, the system comprising:
    an aluminized film window comprised of a polyimide film and an aluminum layer;
    a phosphor layer adjacent to the aluminized film window
    a fiber optic bundle coupled to the to the aluminized film window; and
    a camera sensor optically coupled to the fiber optic bundle, the camera sensor being cooled by a cooling device, wherein the fiber optic bundle is configured to transmit light energy from the spectrum changing layer to the camera sensor;
    a power supply configured to provide an electrical current through the aluminized film window to heat the aluminized film window and prevent condensations;
    wherein the aluminized film window cooperates with a coupling and the fiber optic bundle to create a vacuum.

8. The system according to claim 7, wherein the aluminum layer is less than 200 nanometers thick and the electric current flows through the aluminum layer.

9. The system according to claim 8, wherein the aluminum layer is about 100 nanometers thick and the electric current flows through the aluminum layer.

10. The system according to claim 7, wherein the vacuum encloses the phosphor layer.

11. The system according to claim 7, further comprising a sensor configured to monitor the temperature of the aluminized film window.

12. The system according to claim 11, further comprising controller to monitor a sensor signal from the sensor and adjust the flow of current through the aluminized film window based on the sensor signal.

* * * * *

UNITED STATES PATENT AND TRADEMARK OFFICE
CERTIFICATE OF CORRECTION

PATENT NO. : 7,684,545 B2
APPLICATION NO. : 11/928638
DATED : March 23, 2010
INVENTOR(S) : Michael A. Damento et al.

It is certified that error appears in the above-identified patent and that said Letters Patent is hereby corrected as shown below:

In the Claims

In column 4, claim 7, line 42, after "window and prevent" replace "condensations" with --condensation--.

Signed and Sealed this

Twenty-first Day of September, 2010

David J. Kappos
*Director of the United States Patent and Trademark Office*